(12) United States Patent
Kahlman et al.

(10) Patent No.: US 7,990,837 B2
(45) Date of Patent: Aug. 2, 2011

(54) OPTICAL DISC COMPRISING A WATERMARK AND A METHOD AND RECORDER FOR RECORDING SUCH A DISC

(75) Inventors: Josephus Arnoldus Henricus Maria Kahlman, Eindhoven (NL); Jacobus Maarten Den Hollander, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 208 days.

(21) Appl. No.: 12/519,538

(22) PCT Filed: Dec. 14, 2007

(86) PCT No.: PCT/IB2007/055108
§ 371 (c)(1),
(2), (4) Date: Jun. 17, 2009

(87) PCT Pub. No.: WO2008/078234
PCT Pub. Date: Jul. 3, 2008

(65) Prior Publication Data
US 2010/0034060 A1 Feb. 11, 2010

(30) Foreign Application Priority Data

Dec. 20, 2006 (EP) .................................. 06126708

(51) Int. Cl.
*G11B 7/24* (2006.01)

(52) U.S. Cl. ................................. 369/275.3; 369/124.04
(58) Field of Classification Search ........................ None
See application file for complete search history.

(56) References Cited

U.S. PATENT DOCUMENTS

| 6,496,541 | B1 | 12/2002 | Kahlman et al. |
| 2004/0027940 | A1 | 2/2004 | Minamino et al. |
| 2005/0152255 | A1 | 7/2005 | Kihara et al. |
| 2005/0265156 | A1* | 12/2005 | Nakane et al. ............... 369/47.1 |

FOREIGN PATENT DOCUMENTS

| EP | 0643391 A1 | 3/1995 |
| EP | 1603132 A2 | 12/2005 |
| WO | 0241316 A1 | 5/2002 |
| WO | 2004042729 A1 | 5/2004 |
| WO | 2005071676 A2 | 8/2005 |
| WO | 2007145626 A1 | 12/2007 |

* cited by examiner

*Primary Examiner* — Paul Huber

(57) ABSTRACT

A visible pattern is obtained by modulating the digital sum value. Because the digital sum value modulation allows the choice of several different channel bits groups between DC control points, the selection of a group of channel bits resulting in a change of reflection. This creation of a visible pattern is highly suitable for Blueray as the parity preserving property of the channel code guarantees disparity inversion by the DC-control bit, which keeps the DSV excursions between hard limits. As a result only small DSV deliberate variations are required to produce a visual watermark, which will not deteriorate the bit-detection margin of the optical disc.

21 Claims, 6 Drawing Sheets

OPTICAL DISC COMPRISING A WATERMARK AND A METHOD AND RECORDER FOR RECORDING SUCH A DISC

This application is a 371 of PCT/IB07/55108, filed Dec. 14, 2007.

FIELD OF THE INVENTION

The invention relates to an optical disc comprising
a track,
a plurality of channel bits located in the track,
the plurality of channel bits having a Digital Sum Value,
the Digital Sum Value having a set point determined by a DC control,
the DC control being limited within a DC Control range

BACKGROUND OF THE INVENTION

Such a disc is known from U6496541 where a channel code for recording an optical disc is disclosed. This 17PP channel code is parity preserving. To create watermarks on the optical disc such a code is extended with extra code words so that when encoding a choice exists between code words that yield higher or lower reflectivity. This is however not always possible if most code words are already used by the code and not many additional unused code words are available, so that the result is of low quality because not always the optimal reflectivity can be obtained. In addition adding extra code words to the code means that the decoder has to be modified in order to correctly decode these additional code words, resulting in a loss of backwards compatibility with the installed base.

The visual pattern is a form of watermark allowing the inspection of the disc to determine whether it is a genuine disc or not.

Watermarking and other copy protection measures are taken to stop home copying and professional pirates.

The known record carriers with such a watermark also have the problem that these discs can be duplicated by professional Laser Beam Recorders (LBR's). An LBR is a professional mastering machine for optical discs. The duplication of a record carrier with the known watermarks using such a Laser Beam Recorder is difficult to distinguish from the original record carrier.

SUMMARY OF THE INVENTION

It is an objective of the present invention to provide a record carrier with a visible pattern that cannot be easily copied.

To achieve this objective the optical record carrier according to the invention is characterized in that the Digital Sum Value is a modulated Digital Sum Value diverting from the set point in a limited contiguous area, the limited contiguous area comprising more than one track and being spatially correlated with a visible pattern on the optical disc.

A visible pattern is obtained by modulating the digital sum value. Because the digital sum value modulation allows the choice of several different channel bits groups between DC control points, the selection of a group of channel bits resulting in a change of reflection. Within the constraints of the channel code a change in surface ratio between the marks and the lands for the group of channel bits, in other words a change in ratio between the number of '1' channel bits and the number of '0' channel bits, is possible. For instance more mark surface area than land surface area leads to a change of reflection. By selecting for instance a group of channel bits that cause a reduction in reflection, the area of the record carrier where the marks and lands representing those channel bits are recorded will appear darker. When this is applied to several tracks in a limited contiguous area, the contiguous area will reflect less light and thus will appear darker, allowing the creation of a visible pattern.

It should be noted that the present invention of course also works when the area outside the limited contiguous area is modulated as well, but in a different fashion, for instance uncorrelated or small amplitude, hence creating a contrast between the limited contiguous area and the outside area.

A visual watermark is used in e.g. DVD discs to store content information onto the disc in a visual format by modulating the digital sum value by using freedom in the channel code rules.

This creation of a visible pattern is highly suitable for Blueray as the parity preserving property of the channel code guarantees disparity inversion by the DC-control bit, which keeps the DSV excursions between hard limits. As a result only small DSV deliberate variations are required to produce a visual watermark, which will not deteriorate the bit-detection margin of the optical disc.

It should be noted that although the description often refers to the channel coding used in Blueray, other channel codes comprising DC control means, such as EFM+, are also suitable for application of the present invention. In EFM+ the standard DC control also influences the choice of codewords to minimize the DC content of the channel bits produced, and by manipulating this choice visible patterns are obtained.

In an embodiment of the optical disc the modulated Digital Sum Value is modulated by subtracting a predefined value from the set point within the limited contiguous area.

By adjusting the set point of the DC control, the DC control will adjust the Digital Sum Value to aim to achieve the new set point, thus affecting the choice of channel bits to represent the user data. By modulating the set point the DC control loop can remain intact.

In a further embodiment of the optical disc the modulated Digital Sum Value is modulated to achieve a predefined contrast ratio between the visible pattern and areas on the optical outside the limited contiguous area.

Because multiple choices of groups of channel bits can be selected to represent the user data, and each group of channel bits has a particular reflectivity the contrast between the visible pattern and the surrounding area on the disc can be controlled.

In a further embodiment of the optical disc the modulated Digital Sum Value only exceeds the DC control range within the limited contiguous area.

By modulating the Digital Sum Value in the limited area the Digital Sum Value can exceed the DC Control range in that area, which can be detected by the playback device as well as by visual means. The DC control range can easily be established by looking at the areas of the disc outside the limited contiguous area and determining the DC Control range for that area as a reference.

In a further embodiment of the optical disc an amplitude of the modulation is chosen such that a minimal interference to a servo control loop of a playback device results.

The amplitude of the modulation required to yield a visible pattern can be chosen by selecting that modulation that still yields the visible pattern but has the lowest impact on the Digital Sum Value. Since several options exist when selecting the group of channel bits required to achieve the visible pattern, the group of channel bits that yields the lowest impact on the servo control loop of the playback device can be chosen.

In a further embodiment of the optical disc an amplitude of the modulation is chosen such that a minimal interference to a bit detection of a playback device results.

The amplitude of the modulation required to yield a visible pattern can be chosen by selecting that modulation that still yields the visible pattern but has the lowest impact on the Digital Sum Value. Since several options exist when selecting the group of channel bits required to achieve the visible pattern, the group of channel bits that yields the lowest impact on for instance the bit slicer, and thus on the bit detection, of the playback device can be chosen.

In a further embodiment of the optical disc a frequency content of the modulation is chosen such that a minimal interference to a servo control loop of a playback device results.

The frequency content of the modulation required to yield a visible pattern can be chosen by selecting that modulation that still yields the visible pattern but has the lowest impact on the Digital Sum Value. A change in set point will result in a discontinuity in the servo control loop. The number of changes of the set point can be limited so that the servo control loop of the playback device is disturbed as little as possible.

In a further embodiment of the optical disc a frequency content of the modulation is chosen such that a minimal interference to a bit detection of a playback device results.

The frequency content of the modulation required to yield a visible pattern can be chosen by selecting that modulation that still yields the visible pattern but has the lowest impact on the Digital Sum Value. A change in set point will result in a discontinuity in the bit slicer and thus in the bit detection. The number of changes of the set point can be limited so that the but detection of the playback device is disturbed as little as possible.

In a further embodiment of the optical disc the modulation results in features of the visible pattern that are equal or larger than 0.5 mm.

By keeping the visible features larger than 0.5 mm the changes in set point are reduced, thus minimizing the disturbance of the bit detection and/or servo loop. Keeping the features of the visible pattern larger than 0.5 mm also helps in keeping these features visible with the naked eye.

In a further embodiment of the optical disc the visible pattern is a watermark.

By using the visible pattern as a watermark forgery of the watermark is prevented. Duplication of the data removes the DC Control information and thus also the visible pattern and consequently also the watermark. Hence a illegally duplicated disc can be distinguished from the original optical disc.

Even when advanced equipment is used to keep the DC Control information for use in the duplication process, the alignment of the groups of channel bits on adjacent tracks is lost due to physical differences between the discs and hence the visible image and watermark is lost.

Since the set point for the Digital Sum Value can take several values, the contrast with the surrounding area can also be controlled, allowing the creation of a strongly or weakly visible pattern.

Also the set point can be gradually changed. The more gradually the set point is changed the lower the contrast between the visible pattern and the surrounding are will be.

The WM can only be tampered by means of bit-by-bit-copy using locked disc-rotation-motors. This however will produce a lower-quality copy as disc-errors are copied too. When data is re-encoded, the required DSV set point is extremely difficult to retrieve as it depends on the user-data, data-location and the DSV history of the channel bits. As a result the exact visible pattern cannot reproduce anymore.

Summarizing the invention has the following advantages:
1. Applicable to any optical disc standard
2. The contrast of the visible watermark is variable
3. No format change required The applied WM may also contain additional information concerning master-number, manufacturer, or hidden messages such as "merry Christmas Margot". encoded as a waveform or amplitude variations in the DSV modulation. These data may be detected as DC-variations in the detected signal, by e.g. a "fast-slicer" (observing transitions in the PLL to suppress channel code noise) or a simple feedback-slicer.

Furthermore, excessive fast DSV variations cannot be followed by the detection circuitry and will introduce extra jitter (bit-errors). Hence it is wise to limit the WM amplitude and bandwidth.

DESCRIPTION OF THE DRAWINGS

The invention will now be discussed based on figures.

DETAILED DESCRIPTION OF EMBODIMENTS

Figure 1:
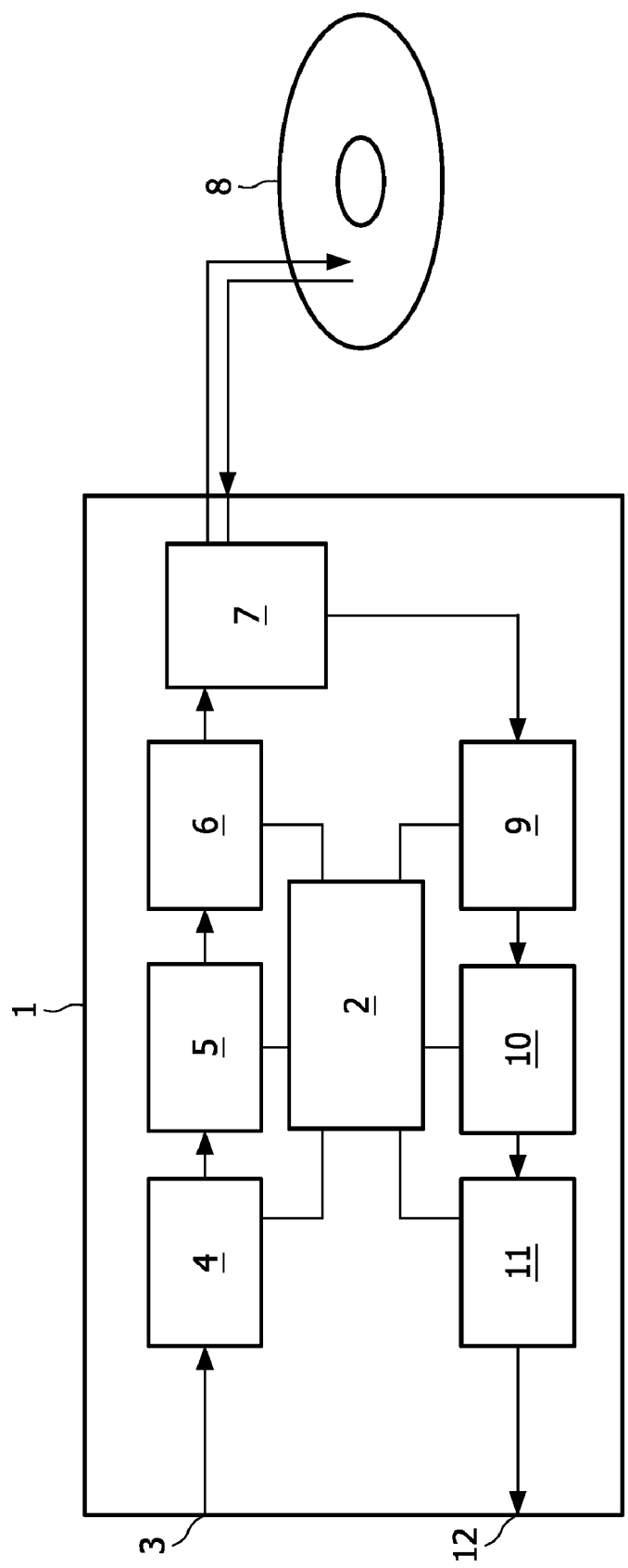
FIG. 1 shows a block diagram of a recording device.

FIG. 1 shows a block diagram of a recording device.

The recording device 1 is arranged for recording user data received on input 3 on the optical record carrier 8. For this, the recording device 1 comprises a data formatter 4. The data formatter 4 receives the user data from the input 3 and determines in what format the user data must be recorded on the optical disc 8. The resulting formatted data is provided by the data formatter 4 to the error correction encoder 5 that applies an error correction code to the data received from the data formatter 4. This error correction encoded data is subsequently provided by the error correction coder 5 to the channel coder 6. The channel coder 6 applies a channel code to the error correction encoded data so that the error correction encoded data is more suitable to be recorded on the optical disc 8. The channel encoder 6 for instance applies a run length limited code with constraints to the error correction encoded data. Another more specific example is the 17PP parity preserving channel code which is often used by channel coders in recording devices for optical discs.

The result of the channel encoder 6 are groups of channel bits which are provided by the channel encoder 6 to the front end 7 where, when in recording mode, the groups of channel bits are converted into a modulated laser beam for recording the marks on the optical disc corresponding to the groups of channel bits as provided by the channel encoder 6. The front end 7 comprises the optical light path that may comprise polarisation means, deflection means, filter means etc.

The end result is an optical disc 8 with channel bits recorded in a track on the optical disc.

Another part of the typical recording device 1 is the playback section 9,10,11,12. When reading marks from the optical disc 8, in reading mode, the front end 7 converts the mark/land pattern into groups of channel bits and provides these groups of channel bits to the channel decoder 9. The channel decoder 9 performs the inverse function of the channel encoder 6 and thus removes the channel code, resulting in error correction encoded data. The channel decoder 9 provides the error correction encoded data, as decoded from the groups of channel bits, to the error correct decoder 10. The error correction decoder 10 performs the error correction decoding on the error correction encoded data and detects/corrects any errors if present and if possible to detect/correct. The output of the error correction decoder is the formatted data which is provided to the data deformatter 11. The data deformatter 11 removes the format from the formatted data and provides the resulting user data to the output 12 of the recording device.

Figure 2:
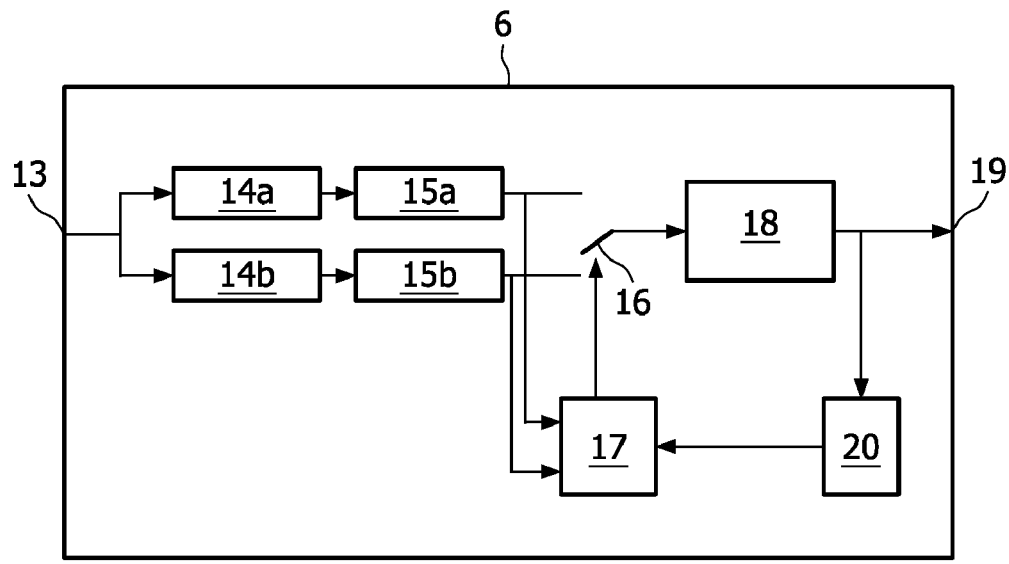
FIG. 2 shows an encoder as commonly used in the recording device.

FIG. 2 shows a channel encoder as commonly used in the recording device.

To explain the invention a 17PP channel encoder 6 with DC control is first explained as it is known in the art and used in Blueray Disc recorders.

The 17PP channel encoder comprises an input 13 on which the error correction coded data is received as explained in FIG. 1. This data is provided to a first 17PP coder 14a and a second 17PP coder 14b. A '0' bit is inserted in the front of a group of bits resulting in a first concatenated group of bits and the first 17PP coder encodes this first concatenated group of bits. This results in a first group of 17PP encoded bits.

In parallel a '1' bit is inserted in the front of the group of bits resulting in a second concatenated group of bits and the second 17PP coder encodes this second concatenated group of bits. This results in a second group of 17PP encoded bits.

Both the first group of 17PP encoded bits and the second group of 17PP encoded bits are provided to a DC control unit 17. It is the task of this DC control unit 17 to minimize the DC content, also known as Running Digital Sum or Digital Sum Value of the channel bits as provided to the front end 7 for recording. This minimization of the DC content is beneficial for the recording and retrieval of the channel bits.

In order to minimize the DC content the DC control unit 17 can operate a switch and thus select either the first group of 17PP encoded bits or the second group of 17PP encoded bits. The DC control unit 17 selects one of these groups to be sent to the 1T precoder 18 and thus subsequently to the output 19 of the channel encoder 6.

In order to determine the Digital Sum Value, i.e. DC content, of the groups of 17PP encoded channel bits, the output of the 1T precoder is integrated by the integrator 20 and the result of the integration is provided to the DC control unit 17.

It is the goal of the DC control unit 17 to keep the Digital Sum Value DSV as close to zero (or another constant value) as possible in order to ensure as low a DC content in the recorded channel bits as possible.

The servo loops in the front end 7 of the recorder or a playback device operate better when the recovered channel bits have minimal DC content. Also the bit detection in a read mode is improved with low DC content.

Figure 3:
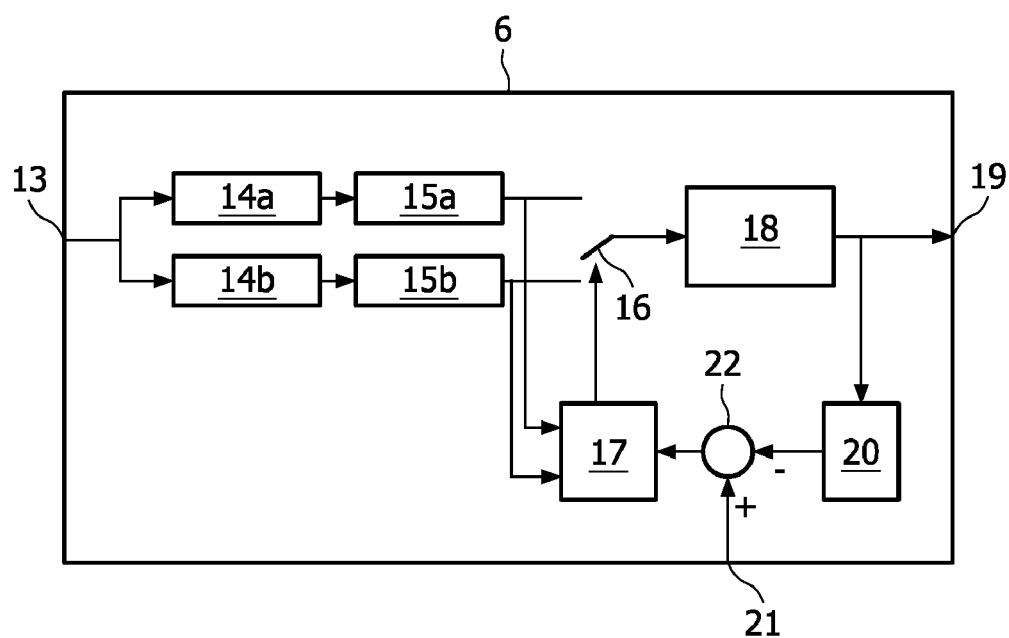
FIG. 3 shows an encoder of the recording device according the invention.

FIG. 3 shows an encoder of the recording device according the invention.

Previously the creation of visible patterns on the optical disc was achieved by modifying the actual channel code, resulting in compatibility problems and reduced channel code performance. The invention avoids this by leaving the 17PP encoding untouched. Therefore the decoding of this untouched 17PP channel code is also not affected, thus guaranteeing compatibility of the optical disc according to the present invention with the existing installed playback devices.

Instead of modifying the channel code itself, the DC control is modified. The advantage of this is that, when properly done, the servo loops and bit detection during read-out of the data is not affected, yet significant changes in reflectivity can achieved and effectively controlled.

For this the channel encoder 6 is modified by adding a summation device 22 (or any other device affecting the output of the integrator 20 in a controlled way) between the integrator 20 and the DC control unit 17. To the output of the integrator 20 a value is added as provided to the new water mark input 21 of the channel encoder 6.

While the integrator 20 is operating normally and, let's say is actually outputting a DSV of 0, the DC control unit 17 will receive a value different from 0 when the watermark input 21 is provided with a value. For example when the watermark input 21 is provided with a value of +3, the integrator is providing the summation device 22 with a value of '0', the DC control unit 17 will receive the value '3' and thus starts selecting a different group of 17PP encoded bits in an attempt to reduce the received value of '3' to '0'. Once the DC control unit has achieved this goal, the effective DSV of the outgoing channel bits will be '−3'. The value received at the watermark input 21 thus effectively changes the set point of the original system ('0') to the negative of whatever value is provided to the watermark input. In the example above the set point is changed to '−3'. Obviously, by changing the polarities of the summation device 22, the polarities of the translation from input value to set point value can be changed.

It was found for instance that an increase in the set point results, in the experimental system, resulted in an area with lower reflectivity, thus appearing darker to the eye when several adjacent tracks were treated in that way.

Figure 4:
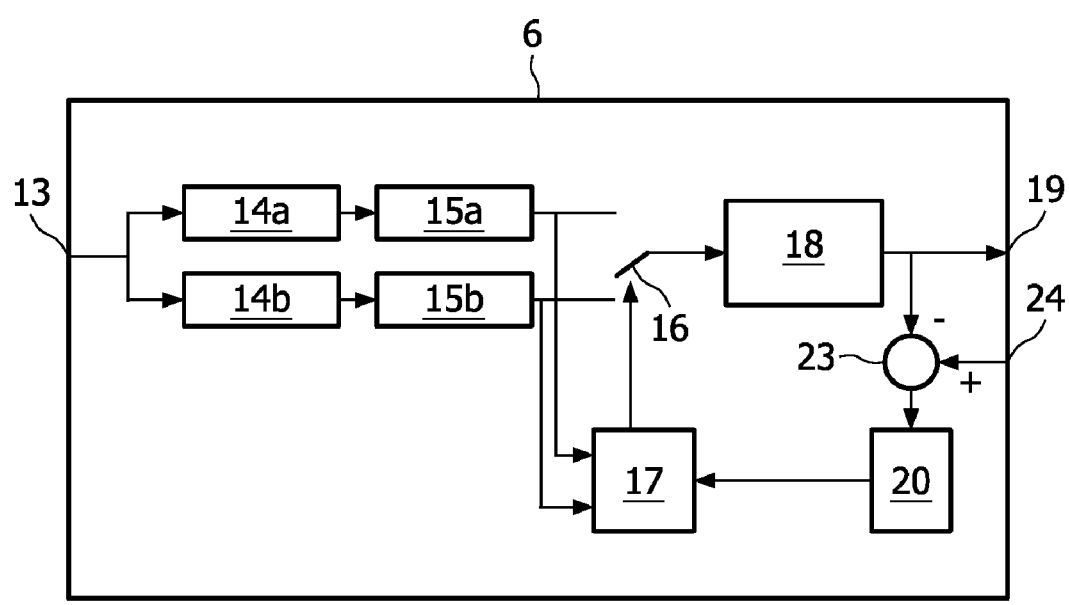
FIG. 4 shows another embodiment of an encoder of the recording device according the invention.

FIG. 4 shows another embodiment of an encoder of the recording device according the invention.

An alternative to a summation device 22 between the integrator 20 and the DC control unit 17 is a summation device 23 (or again any other device affecting the input of the integrator 20 in a controlled way) inserted between the output of the 1T precoder 18 and the input of the integrator 20. This summations device 23 also is coupled to the watermark input 24 of the channel encoder 6.

When a value is presented to the watermark input 24, this value is added to the disparity of the channel bits. After integration by the integrator 20 the DC control unit 17 is consequently provided with a higher value (when the value on the watermark input 24 is positive), and the DC control unit will start, just like explained in FIG. 3, selecting different groups of 17PP encoded bits. It should also be noted that when the watermark value on the watermark input 24 is provided for a longer time, the watermark value will be integrated as well, so a constant value will lead to a higher and higher deviation of the DSV. An alternating input (alternating in polarity) will keep the long time average of the DSV constant.

Figure 5:
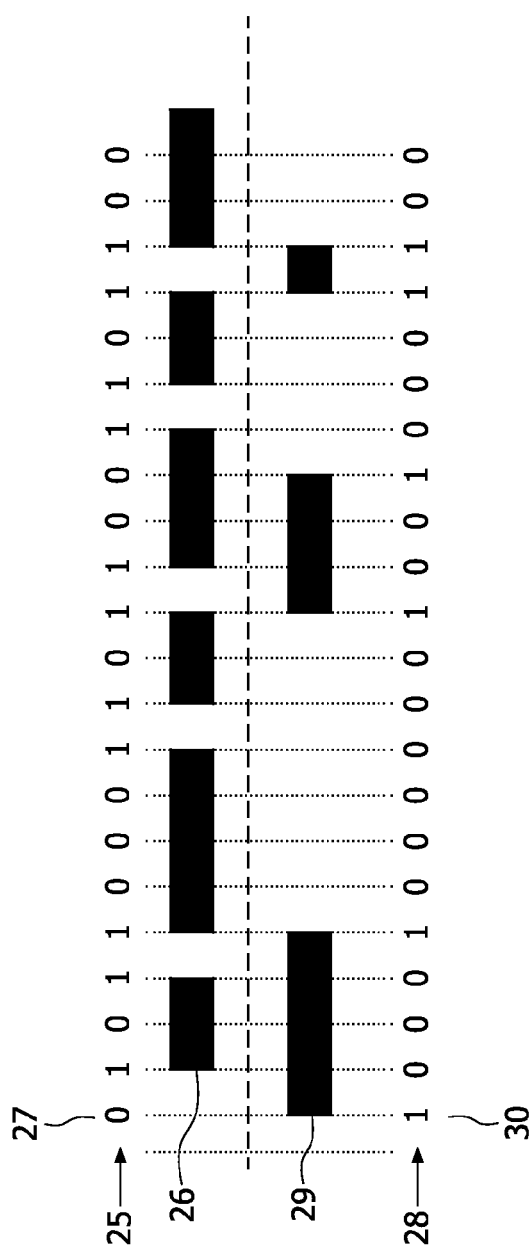
FIG. 5 shows a comparison between two groups of channel bits.

FIG. 5 shows a comparison between two groups of channel bits.

Referring back to the description of FIG. 2, a first group of 17PP encoded channel bits 25 and a second group of 17PP encoded channel bits 28 were generated. In FIG. 5 such a first group of channel bits 25 is shown together with their corresponding first group of marks and lands 26 on the optical disc. As can be seen, the marks are interrupted by lands but there are many marks, thus reducing the reflectivity and rendering the optical disc darker in this area, especially if this treatment is provided to several adjacent tracks.

In FIG. 5 such a second group of channel bits 28 is also shown together with their corresponding second group of marks and lands 29 on the optical disc. As can be seen, the marks are interrupted by lands but there are fewer marks, thus increasing the reflectivity and rendering the optical disc lighter in this area compared to the first group of 17PP encoded bits, and again, especially if this treatment is provided to several adjacent tracks.

Figure 6:
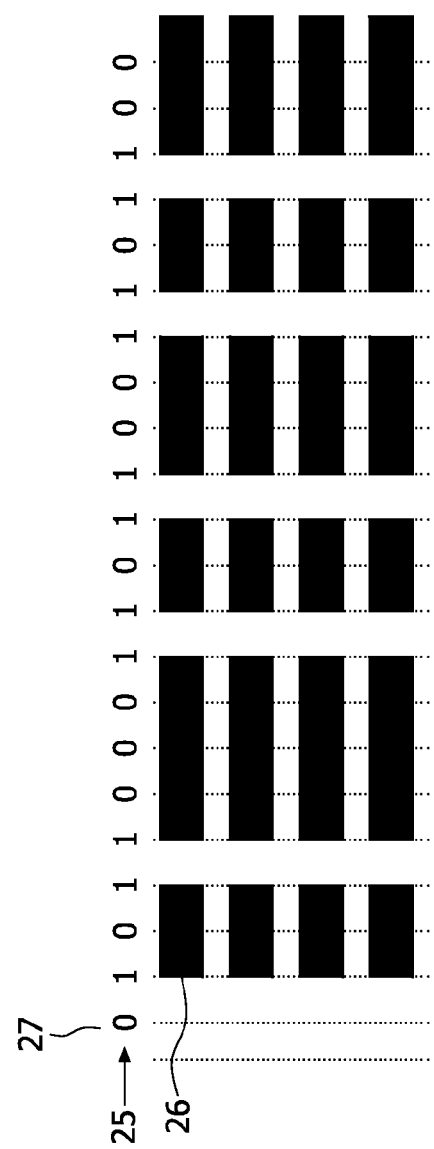
FIG. 6 shows a section of an optical disc with channel bits chosen for low reflectivity.

FIG. 6 shows a section of an optical disc with channel bits chosen for low reflectivity.

For simplicity four identical tracks are shown using the same first group of channel bits 25. The pattern of marks and lands is kept identical to the first group of marks and lands 26 of FIG. 5. This is for illustration purposes only. It should be noted that having identical patterns on adjacent tracks is unlikely but showing the typical variation in the pattern would unnecessarily complicate the explanation. The effects of the invention however also work for four identical tracks as the invention is not dependent on the content of the user data and hence four identical tracks can safely be used for the explanation.

Figure 7:
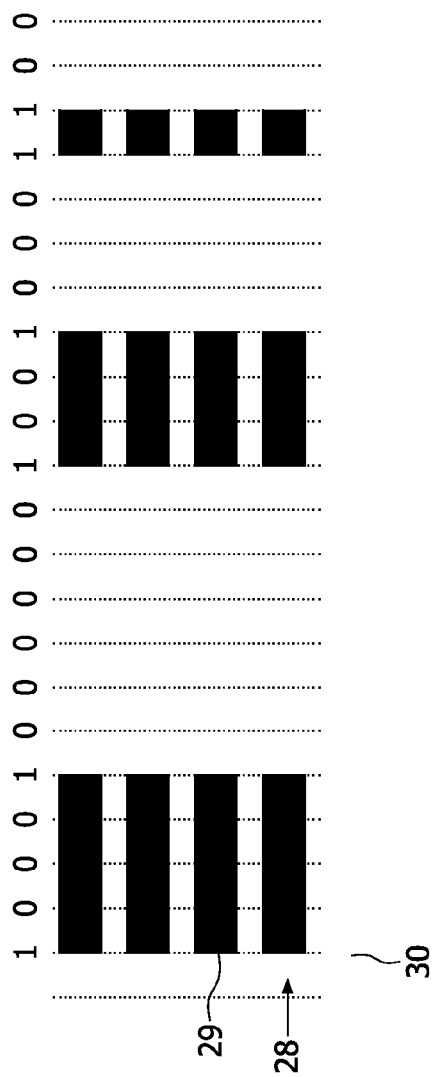
FIG. 7 shows a section of an optical disc with channel bits chosen for high reflectivity.

As can be seen there are relatively many marks and the reflectivity of this section of the disc is relatively low, resulting in a relatively dark area on the optical disk FIG. 7 shows a section of an optical disc with channel bits chosen for high reflectivity.

For simplicity four identical tracks are shown. The pattern of marks and lands is kept identical to the second group of marks and lands 29 of FIG. 5. This is for illustration purposes only. It should be noted that having identical patterns on adjacent tracks is unlikely but showing the typical variation in the pattern would unnecessarily complicate the explanation. The effects of the invention however also work for four identical tracks as the invention is not dependent on the content of the user data and hence four identical tracks can safely be used for the explanation.

As can be seen there are relatively few marks and the reflectivity of this section of the disc is relatively high, resulting in a relatively light area on the optical disk compared to areas where the first group of marks and lands 26 are present, or areas where the normal uncorrelated DC control has determined channel bits to be recorded.

The channel bits to which the marks and lands 29 correspond are shown, just as in the other figures, above the marks and lands as a sequence of '0' and '1'.

Figure 8:
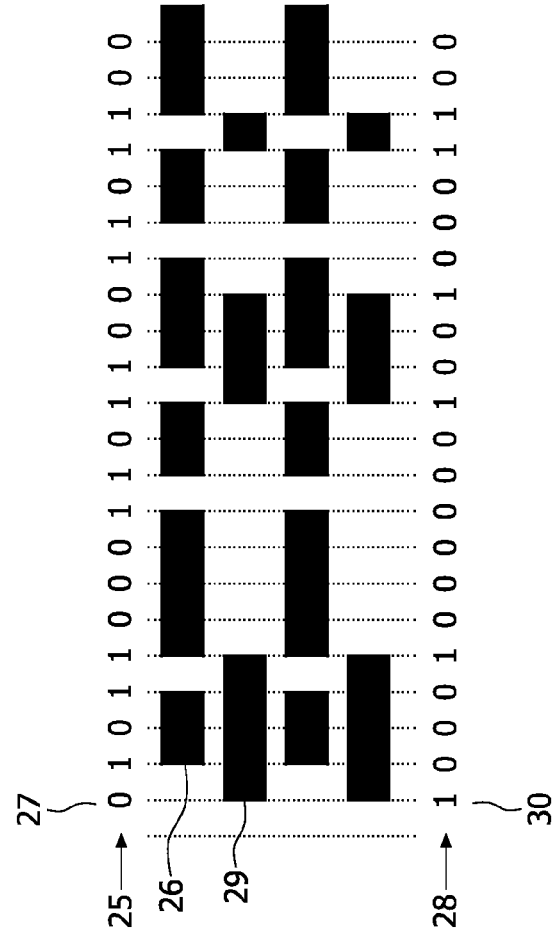
FIG. 8 shows a section of an optical disc with an intermediate reflectivity.

FIG. 8 shows a section of an optical disc with an intermediate reflectivity.

The section of the disc in FIG. 8 again uses the same first group of marks and lands 26 and second group of marks and lands 28 to maintain consistency with the FIGS. 5, 6 and 7.

As can be seen when for instance tracks with first group of marks and lands 26 and tracks with the second group of marks and lands 28 are alternated as shown, an intermediate level of reflectivity is obtained and thus an intermediate 'grey' situated on the reflectivity scale between the more extreme situations, where only first group of marks and lands 26 are present and where only second group of marks and lands 28 are present, can be created.

The alternation shown is one track with high reflectivity and one track with low reflectivity, but using a different mix, for instance alternating 5 tracks with the first group of marks and lands 26 and 1 track with the second group of marks and lands 28, results in further intermediate values.

Also, manipulation of the set point can create a different pattern of channel bits and thus further groups of marks and lands that have intermediate reflectivity, and thus, when combining several tracks with these further groups, areas with intermediate reflectivity, creating patterns with a fine greyscale.

Figure 9:
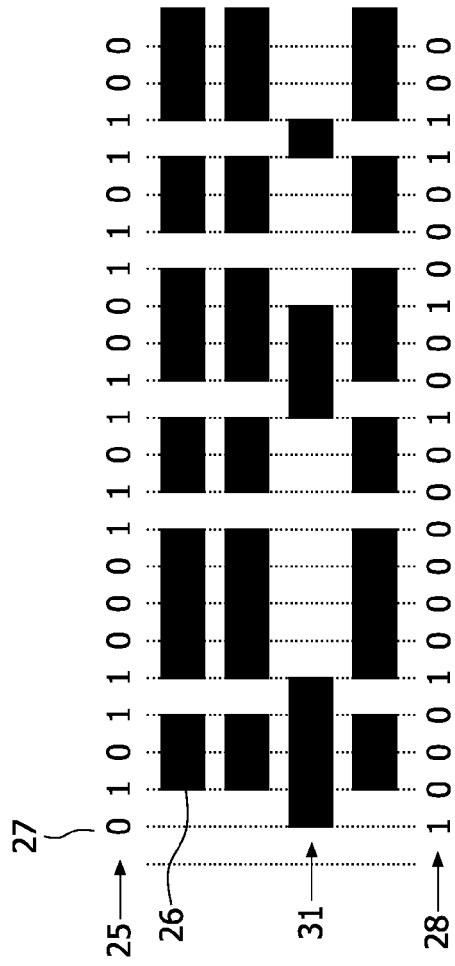
FIG. 9 shows the effect of duplication without DC Control

FIG. 9 shows the effect of duplication without DC Control. Assuming that the original disc was created with a watermark as shown in FIG. 6, an illegal duplication would lead to the loss of the DC control information since that information is removed by the slicer in the bit detector and the subsequent decoding. Hence the DC content information is not easily accessible. When such information is re-encoded to be recorded on an illegal copy, the DC control unit of that recorder will take different decisions and thus the selection of groups of 17PP encoded bits will be different then in FIG. 6. Hence in FIG. 9 one track has a different pattern of channel bits and thus of marks and lands, i.e. the second group of marks and lands 31.

The channel bits 28 corresponding to this second group of marks and lands are denoted below the mark/land patterns. The watermark is thus changed, which can be detected easily. This happens on a real optical on a much larger scale since the watermark input value is missing and completely different decisions will be taken, thus even more completely destroying the watermark of FIG. 6.

Also, for a recorder it is very difficult to establish the required spatial correlation between the watermark input value and the recording are where the channel bits will be recorded. On an LBR such correlation can be established by the original manufacturer of the legal optical discs.

Figure 10:
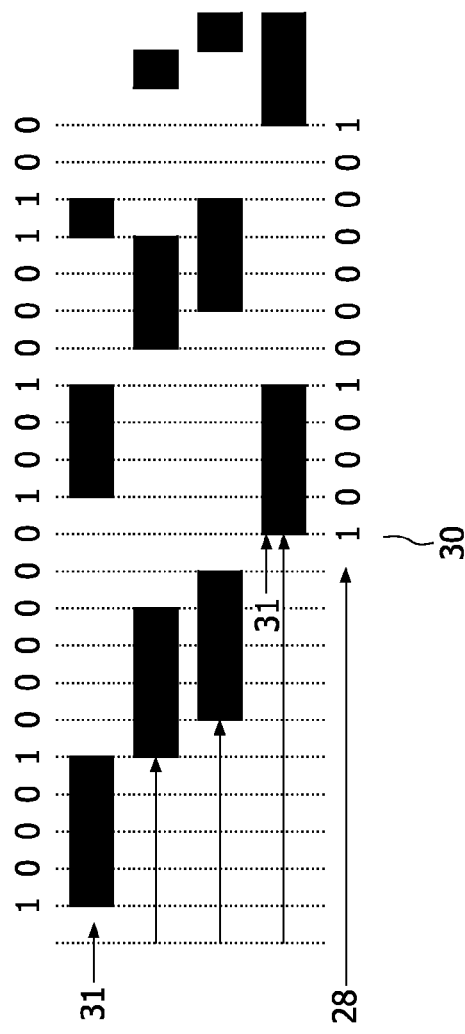
FIG. 10 shows the effect of duplication with DC Control.

FIG. 10 shows the effect of duplication by a bit by bit copy or by a re-encoding with maintained DC Control information.

Even when DC Control information can be preserved, the spatial location of the groups of marks and lands as recorded is very hard to control because of the mechanical tolerances of the mastering machines. In FIG. 10 the second group of marks and lands 31 is used to show the result of a shift in position indicated by the three arrows, each arrow indicating the amount of shift for that track.

The resulting pattern should be compared to the original situation in FIG. 7, where the second groups of marks and lands 29 are aligned. A shift as shown in FIG. 10 when happening on a large scale will destroy the carefully designed watermark.

The invention claimed is:
1. An optical disc comprising
a track,
a plurality of channel bits located in the track,
the plurality of channel bits having a Digital Sum Value,
the Digital Sum Value having a set point determined by a DC control,
the DC control being limited within a DC Control range
characterized in that the set point is a modulated setpoint in a limited contiguous area, the limited contiguous area comprising more than one track and being spatially correlated with a visible pattern on the optical disc.
2. An optical disc as claimed in claim 1,
where the modulated setpoint is modulated by subtracting a predefined value from the set point or adding a predefined value to the set point within the limited contiguous area.
3. An optical disc as claimed in claim 1,
where the modulated setpoint is modulated by changing the set point to achieve a predefined contrast ratio between the visible pattern and areas on the optical outside the limited contiguous area.

4. An optical disc as claimed in claim 1,
where the modulated setpoint only exceeds the DC control range within the limited contiguous area.

5. An optical disc as claimed in claim 1,
where an amplitude of the modulation is chosen such that a minimal interference to a servo control loop of a playback device results.

6. An optical disc as claimed in claim 1,
where an amplitude of the modulation is chosen such that a minimal interference to a bit detection of a playback device results.

7. An optical disc as claimed in claim 1,
where a frequency content of the modulation is chosen such that a minimal interference to a servo control loop of a playback device results.

8. An optical disc as claimed in claim 1,
where a frequency content of the modulation is chosen such that a minimal interference to a bit detection of a playback device results.

9. An optical disc as claimed in claim 7,
where the modulation results in features of the visible pattern that are equal or larger than 0.5 mm.

10. An optical disc as claimed in claim 1 where the visible pattern is a watermark.

11. A recording method for recording an optical disc as claimed in claim 1, comprising the steps of:
defining a limited contiguous area representing a visible pattern,
modulating the set point in the limited contiguous area.

12. A recording method as claimed in claim 11,
comprising the step of modulating the set point by subtracting a predefined value from the set point.

13. A recording method as claimed in claim 11,
comprising the step of modulating the set point by adding a predefined value to the set point.

14. A recording method as claimed in claim 11,
comprising the step of modulating the set point to achieve a predefined contrast ratio between the visible pattern and areas on the optical outside the limited contiguous area.

15. A recording method as claimed in claim 11,
comprising the step of only allowing the modulated set point to exceed the DC control range within the limited contiguous area.

16. A recording method as claimed in claim 11,
comprising the step of changing an amplitude of the modulation such that a minimal interference to a servo control loop of a playback device results.

17. A recording method as claimed in claim 11,
comprising the step of changing amplitude of the modulation such that a minimal interference to a bit detection of a playback device results.

18. A recording method as claimed in claim 11,
comprising the step of changing a frequency content of the modulation such that a minimal interference to a servo control loop of a playback device results.

19. A recording method as claimed in claim 11,
comprising the step of changing a frequency content of the modulation such that a minimal interference to a bit detection of a playback device results.

20. A recording method as claimed in claim 11,
comprising the step of limiting a rate of change of the modulation such that features of the visible pattern that are equal or larger than 0.5 mm result.

21. A recording device for recording information on a record carrier as claimed in claim 1 where the recording device comprises:
a processor to define a limited contiguous area representing a visible pattern,
a modulator, for modulating the set point of the Digital Sum Value in the limited contiguous area,
the modulator being coupled to the processor for receiving information about the limited contiguous area from the processor.

* * * * *